(12) United States Patent
Asano et al.

(10) Patent No.: US 7,132,815 B2
(45) Date of Patent: Nov. 7, 2006

(54) METHODS AND DEVICES FOR PROCESSING SERVO CONTROL SIGNALS

(75) Inventors: Hideo Asano, Machida (JP); Jun Oie, Allentown, PA (US); Enrico R. Timbol, Tokyo (JP)

(73) Assignee: Agere Systems Inc., Allentown, PA (US)

( * ) Notice: Subject to any disclaimer, the term of this patent is extended or adjusted under 35 U.S.C. 154(b) by 281 days.

(21) Appl. No.: 10/815,694

(22) Filed: Apr. 2, 2004

(65) Prior Publication Data

US 2005/0218855 A1    Oct. 6, 2005

(51) Int. Cl.
*G05B 11/32* (2006.01)

(52) U.S. Cl. .................. 318/625; 318/560; 318/632
(58) Field of Classification Search ............. 318/625, 318/560

See application file for complete search history.

(56) References Cited

U.S. PATENT DOCUMENTS

| 5,063,454 | A | * | 11/1991 | Hashimoto | ............... 360/78.04 |
| 5,204,601 | A | * | 4/1993 | Hirata et al. | ................ 318/606 |
| 5,486,744 | A | * | 1/1996 | Watanabe | .................... 318/560 |
| 6,839,194 | B1 | * | 1/2005 | Koyanagi | .................... 360/51 |
| 6,972,540 | B1 | * | 12/2005 | Wang et al. | ................. 318/650 |
| 2005/0264252 | A1 | * | 12/2005 | MIzuno et al. | ............. 318/575 |

* cited by examiner

*Primary Examiner*—Lincoln Donovan
*Assistant Examiner*—Erick Glass

(57) ABSTRACT

Servo control signals and data content associated with two different devices, such as a hard disc drive magnetic head and a digital video disc laser may both be processed without substantial loss of data or control signal errors using a single controller.

20 Claims, 3 Drawing Sheets

METHODS AND DEVICES FOR PROCESSING SERVO CONTROL SIGNALS

BACKGROUND OF THE INVENTION

Today, many computers and the like include both a hard disc drive ("HDD") and a digital video disc ("DVD") drive or provide the option of plugging in or adding one or more HDD or DVD drives. Existing computers and the like use separate controllers and programs to separately control a DVD and an HDD. Each control mechanism has an associated cost. Therefore, it is desirable to provide a single control mechanism that is capable of controlling both a DVD and an HDD, as well as other devices.

Existing attempts to control both an HDD and a DVD with a single control mechanism have failed to overcome problems associated with the reception of so-called servo control signals and their associated data. By way of background, it is known that an HDD servo control signal indicates a present position of a magnetic head or the like used to, for example, read and write information from an HDD. Similarly, a DVD servo control signal indicates a present location of a laser (e.g., laser diode or LED) used to read/write information from a DVD. Presently, each of these control signals is sent to a separate controller which, upon reception of the control signals, determines a next position for the magnetic head or laser. Unfortunately, both signals may be sent at the same time or in such close proximity to one another that it is practically impossible to detect a first control signal (e.g., an HDD signal), followed by its associated data/content and then process the control signal and the data/content before the arrival of a second control signal (e.g., a DVD signal) and its associated data/content. A controller must either suspend processing of the first servo control signal and its associated data in order to receive the second servo control signal and its associated data or choose to ignore the second control signal and its associated data until it has finished processing the first servo control signal and its associated data. In the former case, a delay in the processing of the first servo control signal and its associated data makes it practically impossible to provide real-time adjustments to an associated device, a situation which is unacceptable. In the latter case, the failure to detect the second servo control signal and its associated data makes it practically impossible to adjust the second device at all.

It is therefore also desirable to provide for methods and devices which are capable of processing servo control signals from, for example, both an HDD and a DVD along with associated data/content in such a manner that both devices can be controlled in real-time with no, or substantially few, errors.

SUMMARY OF THE INVENTION

The present invention provides for servo controllers operable to process two servo control signals and any associated data content by detecting a first servo control signal associated with a first device (e.g., HDD magnetic head), detecting a second servo control signal associated with a second device (e.g., DVD laser), calculating a time period substantially equal to a time between detection of the first and second servo control signals, and adjusting a servo control signal pattern associated with the second device when the calculated time period is not within an acceptable range. The adjustment of the servo control pattern enables the controller to process both servo control signals and associated data content in real-time without substantial loss of data content or servo control signal errors.

In another embodiment, adjustment of a servo control pattern is not necessary because the processing speed of the controller may have improved. As such, the present invention provides for a servo controller operable to detect a first servo control signal associated with a first device, process said first servo control signal and associated data content prior to the detection of a second servo control signal, detect a second servo control signal associated with a second device, and process said second servo control signal and associated data content prior to the detection of a next, first servo control signal.

DETAILED DESCRIPTION OF THE INVENTION

Figure 1:
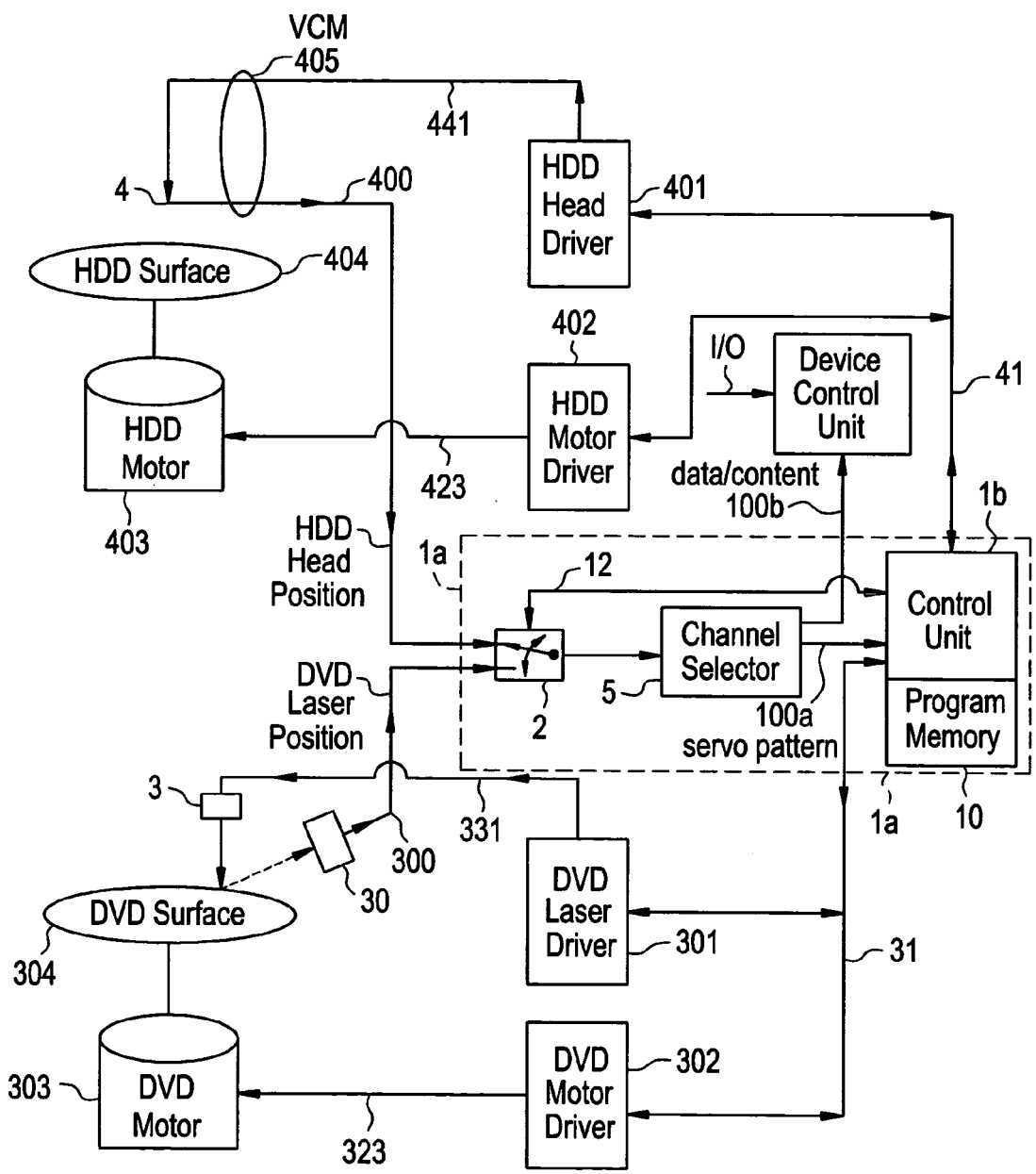
FIG. 1 depicts a simplified block diagram of a control unit that controls an HDD and a DVD according to one embodiment of the present invention.
Figure 2:
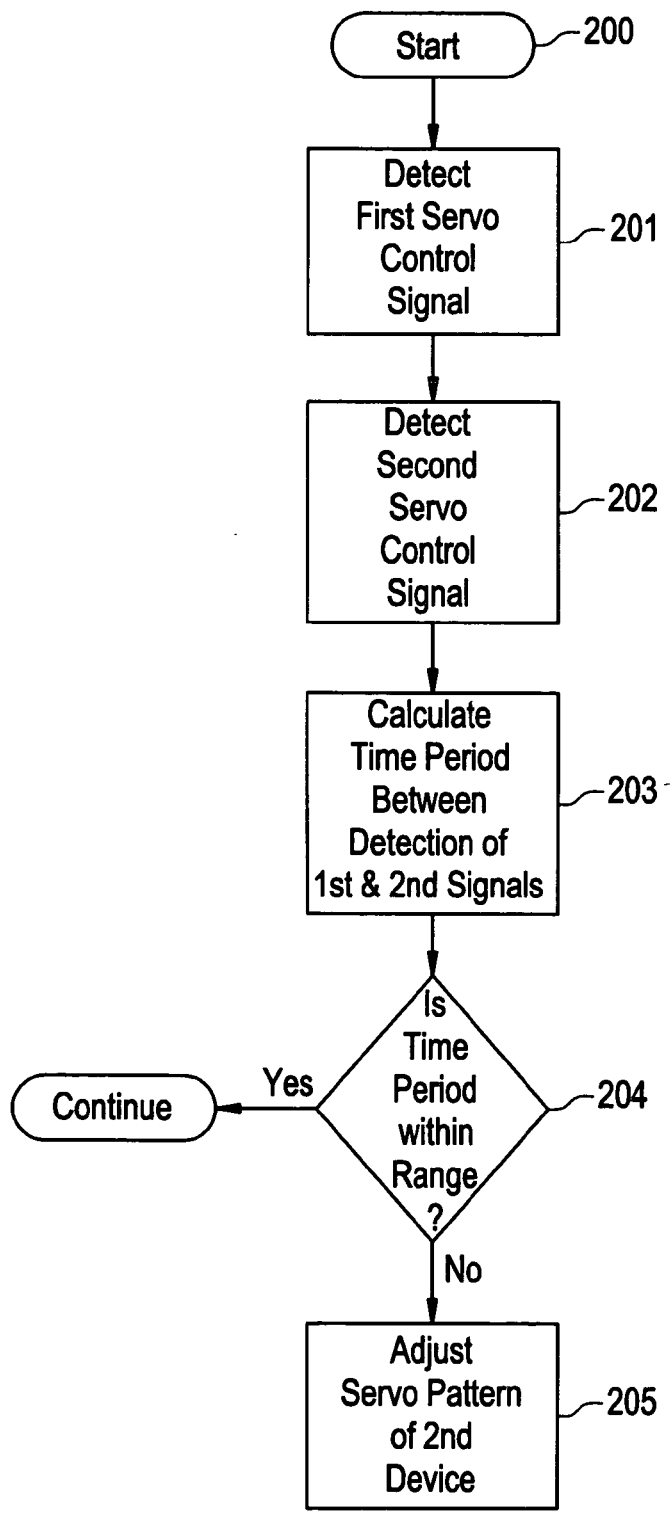
FIG. 2 depicts a flow diagram illustrating a method of detecting HDD and DVD servo control signals according to one embodiment of the present invention.

Referring now to FIG. 1, there is depicted a simplified block diagram of a control unit operable to control two devices, such as an HDD and DVD, according to one embodiment of the present invention. More specifically, FIG. 1 depicts a dual, servo controller 1a (shown by dotted line) which comprises control unit 1b, program memory 10, channel selector 5 and a switchable detector (hereafter referred to as "detector") 2 among other components. A dual servo controller provided by the present invention may comprise a combination of one or more of these components. Though shown as separate components in FIG. 1, these components may be combined into fewer components (e.g., one component) or further broken down into additional components provided they carry out the features and functions of the present invention. In operation, the control unit 1b is operable to control the operation of the detector 2 in order to alternately detect a servo pattern from the DVD and HDD. FIG. 2 depicts a flow diagram of some of the steps involved in detecting each servo control pattern according to one embodiment of the present invention. More specifically, the detector 2 is operable to detect a servo control signal sent via pathway 400 which represents a position of an HDD head 4 above the surface of an HDD storage media 404. Similarly, detector 2 is operable to detect a servo control signal sent via pathway 300 from a photo-detector 30 which is operable to detect the position of a laser 3 based on the angle, etc. of reflected laser light off of a DVD storage media surface 304.

In an attempt to simplify the explanation which follows, the servo control signal sent via pathway 400 which represents an HDD head 4 position will be referred to as a "first servo control signal" while the servo control signal sent via pathway 300 which represents a position of the laser 3 over DVD storage media surface 304 will be referred to as a "second servo control signal." It should be understood that the designations first and second are arbitrary and can be reversed.

At some point in time, typically upon power-up, the control unit 1b will send instructions to detector 2 instructing it to detect either the first servo control signal or the second servo control signal. For ease of explanation, it will be assumed in the discussion below that the first servo control signal is detected first. In one embodiment of the present invention, upon power-up (step 201 of FIG. 2), a first servo control signal associated with a first device, such as an HDD magnetic head 4, is detected by the detector 2 and forwarded on to the control unit 1b via channel selector 5. The detector 2 remains in a position to detect any associated data content which follows the first servo control signal. This associated data content is also passed on to the control unit 1b. Thereafter, the control unit 1b is operable to send an instruction to the detector 2 instructing it to detect the second servo control signal which is associated with the second device, such as laser 3 (step 202).

Though the control unit 1b has received data content associated with the first servo control unit, it does not process this data content upon power-up. Instead, the control unit 1b is operable to calculate a time period substantially equal to the time between detection of the first and second servo control signals (step 203). Thereafter, the control unit 1b is operable to compare this calculated time period to acceptable, time period ranges which are stored within the unit 1b or within program memory 10 (step 204). If the results of this comparison show that the calculated time period is not within an acceptable range (i.e., a range which will allow detection and processing of both servo control signals and associated data content), then the controller 1a is further operable to adjust a servo control signal pattern associated with the second device 3 (step 205). This new servo control signal pattern has the effect of adjusting the occurrence (i.e., timing) of second servo control signals with respect to the occurrence of first servo control signals such that both the first and second servo control signals and their associated data content can be processed in real-time without substantial loss of data content or servo control signal errors.

Figure 3:
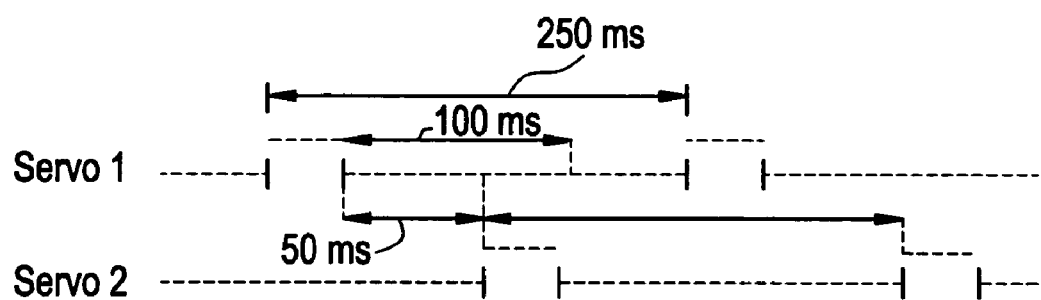
FIG. 3 depicts a simplified timing pattern for two servo control signals, each associated with a different device.

For example, referring to FIG. 3, suppose the time period between successive, first servo control signals is 250 milliseconds, that the second servo control signal occurs 50 ms after the first servo control signal and that the time it takes to process the first servo control signal and its associated data content is 100 microseconds. Based on these examples, the second servo control signal must be detected before the first servo control signal and its associated data content are processed. This is undesirable. Therefore, the occurrence of the second servo control signal must be adjusted such that it occurs after the first servo control signal and its associated data content has been processed (e.g., after 100 microseconds).

Figure 4:
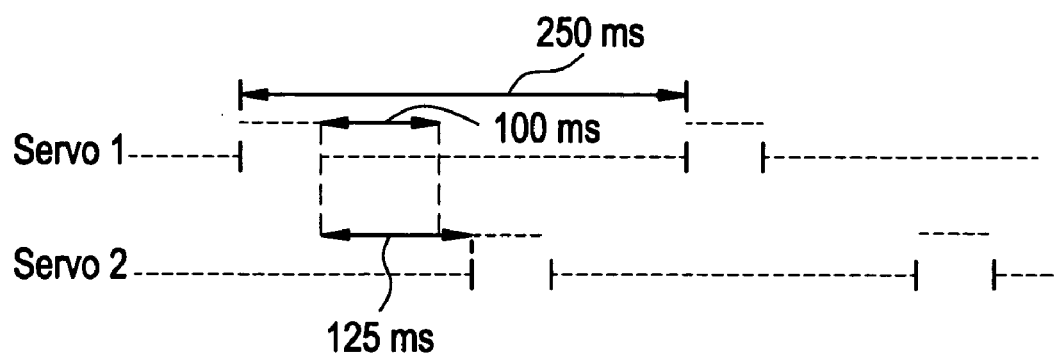
FIG. 4 depicts simplified timing patterns for two servo control signals, each associated with a different device, that are adjusted to allow both signals and any associated data content to be processed using one controller according to an embodiment of the present invention.

In one embodiment of the present invention, the inventors discovered an acceptable range is substantially equal to at least one half a time period between successive, first servo control signals. That is, the time period between the occurrence of a first and second servo control signal is desirably substantially equal to half the time period between successive first servo control signals. FIG. 4 depicts an example of an adjusted second servo control pattern.

In operation, the controller 1a may be operable to control a DVD laser driver 301, DVD motor driver 302, DVD motor 303 and laser 3 such that each second servo control signal making up a second servo control signal pattern falls halfway in between the occurrence of successive, first servo control signals received from the HDD, in this case 125 ms. Alternatively, the controller 1a may be operable to adjust the servo control signal pattern associated with the second device such that the time period between the first servo control signal and second servo control signal is substantially equal to a time period which is greater than one half the time period between successive, first servo control signals (in this case greater than 125 ms). That is, the occurrence of the second servo control signals occurs closer to the occurrence of a subsequent first control signal than it does to the occurrence of a previous, first servo control signal.

The explanation above assumes that once set, the first and second servo control signal patterns associated with the HDD head 4 and laser 3 will not change. Realistically, this does not occur. Taking this into consideration, the present invention provides for additional embodiments which correct for changes in the timing patterns of the servo control signals and data content over time to allow the processing of the servo control signals and data content without substantial loss of data content or servo control signal errors.

In accordance with an additional embodiment of the present invention, in order to maintain the ability to detect and process both servo control signals and their associated data content, the controller 1a may be operable to adjust the position of the second device 3 with respect to the DVD storage media 304 when a calculated time period between a received second servo control signal and a first servo control signal is not within an acceptable range until the time period falls within the acceptable range. That is, if the control unit 1b detects that the timing of a second servo control signal has shifted to a position such that it now occurs too close to a first servo control signal making it impractical to be able to detect and process both servo control signals and their associated data, then the controller 1a is operable to adjust the timing of the occurrence of the second servo control signals (i.e., adjust the second servo control signal timing pattern). In one embodiment of the present invention, the controller 1a is operable to adjust this timing by adjusting the position of the second device 3 with respect to the storage media surface 304. By so doing, the timing of the received second servo control signals will also be adjusted. Those skilled in the art will realize that the controller 1a may be operable to calculate the positions of the second device 3 with respect to the storage media surface 304 or the position of the first device 4 with respect to a storage media surface 404 based on the reception of either the second or first servo control signals among other signals, respectively.

The control unit 1b may comprise a microprocessor, digital signal processor or a combination of electronic components capable of carrying out the features and functions of the present invention. The program memory 10 may comprise one or more programs stored in one or more different types of storage devices which are operable to store at least one or more instructions for controlling the position of the first and second devices 3, 4, and controlling the detector 2 and selector 5, among other instructions.

Sometimes the rotational speed of the first storage media surface 404 and/or second storage media surface 304 changes. When this occurs, the corresponding servo control signals occur at different points (i.e., the corresponding servo control signal timing patterns change). Changes in one or both servo control signal timing patterns must be monitored in order to ensure that both servo control signals and their associated data may be processed without substantial loss of data content or servo control signal errors.

In a further embodiment of the present invention, the controller 1a is operable to detect a rotational speed of a first storage media surface 404 associated with a first servo control signal and a rotational speed of a second storage media surface 304 associated with a second servo control signal. Thereafter, the control unit 1b is operable to adjust the rotational speed of one or both storage media 304, 404 in order to ensure that the time period between detection of a first servo control signal and detection of a second servo control signal remains within an acceptable range as discussed previously above.

In practice, there are opportunistic times during which it is easier to detect a second servo control signal. For example, at the end of a first track of a first storage media, the first device 4, among other components, must be adjusted to read a second track. During this time period, there is an opportunity for the controller 1a to detect and process the second servo control signal and associated data content. In accordance with the present invention, the inventors provide for just such an embodiment. That is, in a further embodiment of the present invention, the controller 1a is operable to detect a second servo control signal and its associated data content after first detecting an end to a track of a storage media associated with the first servo control signal. Though in the explanation just given this detection occurs between the first and second tracks of the first storage media 404, it should be understood that this detection may occur between any two tracks of the storage media 404 (or if priorities or designations are reversed, between tracks of media 304).

Even though the present invention envisions adjusting the servo control patterns of the second (or first) device upon power-up and when the rotational speed of the second device changes, this still may not be enough to ensure that the timing of the first and second servo control signal timing patterns are maintained to allow a controller to detect and process both control signals and their associated data content. For example, for a given time period a second servo control signal may arrive at the same time as a first servo control signal. In this case, the controller 1a would have to make a choice between continuing to process data content associated with the first servo control signal, in which case the arrival of the second servo control signal would be ignored, or suspending the processing of this data content in order to detect and process the second servo control signal and its associated content. In this latter case, suspension of such processing would make it practically impossible for the control unit 1b to send signals to the HDD head driver 401, etc., in a sufficient amount of time to properly adjust an HDD head 4 in real-time. This would eventually result in a slow down of the operation of the HDD system itself. Both of these results are undesirable.

To overcome these unsatisfactory results, the present invention provides for a controller 1a that first processes first servo control signals and their associated data content provided there has been no previously detected second servo control signal and associated data content that has been ignored (i.e., not processed). On the other hand, if a second servo control signal and associated data content has been ignored, then the present invention provides for a controller that detects and processes a next occurring second servo control signal and associated data content instead of a next occurring first servo control signal and associated data content. Said another way, as long as every previously received second servo control signal and associated data content have been processed, then the next occurring first servo control signal and associated data content will also be processed. However, if a previously occurring second servo control signal and associated data content has not yet been processed, then processing of the first servo control signal and associated data content will be postponed in favor of processing the next occurring second servo control signal and associated data content.

Likewise, it may occur that it is the first servo control signal and associated data content which has been ignored during the processing of a second servo control signal. In this event, the present invention provides for a controller which is operable to process a second servo control signal and its associated data content provided a previously detected first servo control signal and associated data content have already been processed or provided a previously detected second servo control signal has not been processed. Said another way, an arriving second servo control signal and associated data content will be processed as long as the processing of a first servo control signal and associated data content has been completed or if such processing has not been completed but a previously occurring second servo control signal has been ignored, then such processing of the first servo control signal and data content will be suspended in favor of processing the next occurring second servo control signal and associated data content.

The examples given above have assumed that the operating speed of controllers which exist today are not fast enough to both receive and process servo control signals and associated data content of two devices without adjusting one or both of the servo control timing patterns of the devices. However, as the speed of controllers increases (or just the overall detection and processing speed), it may occur that such adjustments are not needed. For example, instead of taking 100 microseconds to process a servo control signal and data content, future devices may complete such processing in less than 10 microseconds or less than 1 microsecond. Realizing this, the present invention provides for yet another embodiment where a controller is operable to detect a first servo control signal associated with a first device, process the first servo control signal and associated data content prior to the detection of a second servo control signal, and then detect a second servo control signal associated with a second device and process that control signal and associated data content prior to the detection of a next, first servo control signal. That is, the present invention provides for alternative embodiments where the control signal and associated data content of one device is completely processed before the detection of a servo control signal and associated data content of a second device.

The discussion above has set forth some examples of the present invention where a single controller is used to process servo control signals and data content associated with two different devices. It is next to impossible to provide every possible example which falls within the scope of the present invention. For example, though an HDD magnetic head and DVD laser have been used as the two devices, other combinations and devices may be used (e.g., two HDD magnetic heads, two DVD lasers, etc.). Taking this into consideration, the true scope of the present invention may be derived from the claims which follow.

We claim:

1. A method for processing more than one servo control signal, the method comprising:

detecting a first servo control signal associated with a first device;

detecting a first servo control signal associated with a second device;

calculating a time period between the detection of the first servo control signal associated with the first device and the detection of the first servo control signal associated with the second device; and adjusting a characteristic associated with at least one of the devices if the calculated time period is not within a predetermined range.

2. The invention of claim 1, wherein the adjusted characteristic is a servo control signal pattern of one of the devices.

3. The invention of claim 1, wherein the adjusted characteristic is a rotational speed of a storage medium corresponding to one of the devices.

4. The invention of claim 1, wherein the adjusted characteristic is a position of one of the devices with respect to its corresponding storage medium.

5. The invention of claim 1, further comprising:
detecting a second servo control signal of one of the devices;
wherein the predetermined range is substantially equal to or greater than one-half of the time period between the first servo control signal and the second servo control signal of one of the devices.

6. The invention of claim 1, wherein at least one of the first device and second device is selected from the group consisting of: a magnetic head, a laser, and an LED.

7. The invention of claim 1, further comprising storing one or more instructions for controlling the position of at least one of the devices with respect to its corresponding storage medium.

8. The invention of claim 1, further comprising:
detecting a rotational speed of at least one storage medium corresponding to at least one of the devices.

9. The invention of claim 1, wherein the timing of the step of detecting the first servo control signal associated with one of the devices is based on the time at which the other device reaches the end of a track of its corresponding storage medium.

10. The invention of claim 1, wherein the predetermined range is selected so as to enable processing of both servo control signals and associated data content in real time, either (i) without substantial loss of data content, (ii) without servo control signal errors, or (iii) without substantial loss of data content or servo control signal errors.

11. A controller device for processing more than one servo control signal, the controller device adapted to:
detect a first servo control signal associated with a first device;
detect a first servo control signal associated with a second device;
calculate a time period between the detection of the first servo control signal associated with the first device and the detection of the first servo control signal associated with the second device; and
adjust a characteristic associated with at least one of the devices if the calculated time period is not within a predetermined range.

12. The invention of claim 11, wherein the adjusted characteristic is a servo control signal pattern of one of the devices.

13. The invention of claim 11, wherein the adjusted characteristic is a rotational speed of a storage medium corresponding to one of the devices.

14. The invention of claim 11, wherein the adjusted characteristic is a position of one of the devices with respect to its corresponding storage medium.

15. The invention of claim 11, further comprising:
detecting a second servo control signal of one of the devices;
wherein the predetermined range is substantially equal to or greater than one-half of the time period between the first servo control signal and the second servo control signal of one of the devices.

16. The invention of claim 11, wherein at least one of the first device and second device is selected from the group consisting of: a magnetic head, a laser, and an LED.

17. The invention of claim 11, further comprising storing one or more instructions for controlling the position of at least one of the devices with respect to its corresponding storage medium.

18. The invention of claim 11, further comprising:
detecting a rotational speed of at least one storage medium corresponding to at least one of the devices.

19. The invention of claim 11, wherein the timing of the step of detecting the first servo control signal associated with one of the devices is based on the time at which the other device reaches the end of a track of its corresponding storage medium.

20. The invention of claim 11, wherein the predetermined range is selected so as to enable processing of both servo control signals and associated data content in real time, either (i) without substantial loss of data content, (ii) without servo control signal errors, or (iii) without substantial loss of data content or servo control signal errors.

* * * * *